United States Patent [19]
Uesugi

[11] 3,713,725
[45] Jan. 30, 1973

[54] CAMERA OBJECTIVE LENS ADJUSTMENT MEMBER

[75] Inventor: Kyozo Uesugi, Osaka, Japan
[73] Assignee: Minolta Camera Kabushika Kaisha, Osaka, Japan
[22] Filed: Nov. 16, 1970
[21] Appl. No.: 89,956

[30] Foreign Application Priority Data

Nov. 24, 1969  Japan.......44/111600 (utility model)

[52] U.S. Cl..................................350/247, 350/252
[51] Int. Cl................................................G02b 7/02
[58] Field of Search......350/245, 247, 252, 254, 255, 350/257, 48, 49, 41

[56] References Cited

UNITED STATES PATENTS

| | | | |
|---|---|---|---|
| 2,861,484 | 11/1958 | Rance | 350/247 |
| 3,563,637 | 2/1971 | Ferguson | 350/252 |
| 947,971 | 2/1910 | Konig | 350/247 |
| 2,285,768 | 6/1942 | Drucker | 350/252 |

Primary Examiner—David Schonberg
Assistant Examiner—Michael J. Tokar
Attorney—Stanley Wolder

[57] ABSTRACT

A camera objective lens mount includes a first circular member rotatably mounted on the front of the camera focussing barrel parallel to the camera focal plane and has a first circular eccentric opening with a spherical peripheral face. A second circular member with a spherical peripheral surface mates and rotatably and tiltably engages the first opening and the camera objective lens is eccentrically mounted in and projects through the second member so as to be universally angularly adjustable and universally movable in directions parallel to the camera focal plane.

3 Claims, 2 Drawing Figures

PATENTED JAN 30 1973

3,713,725

INVENTOR
KYOZO UESUGI
BY Stanley Wolder
ATTORNEY

CAMERA OBJECTIVE LENS ADJUSTMENT MEMBER

BACKGROUND OF THE INVENTION

The present invention relates generally to improvements in adjustments for camera objective lenses and it relates particularly to an improved objective lens mounting which permits the universal angular adjustment of the objective as well as its translational adjustment in a plane parallel to the camera film plane.

In the conventional camera the objective lens is mounted with its optical axis perpendicular to the camera film plane and is only axially adjustable for focussing purposes. However, there are special types of cameras such as studio cameras and architectural cameras in which there are provided mechanisms for adjusting the position of the objective lens in a direction parallel to the camera film plane and mechanisms for adjusting the angle of the objective lens about a transverse horizontal axis through the optical axis. However, these devices are either capable only of angular or translational adjustment, and although mechanisms have been available for accomplishing both of these adjustments such mechanisms have been very complex and expensive devices, inconvenient to handle and manipulate, frequently unreliable and otherwise leaving much to be desired.

SUMMARY OF THE INVENTION

It is a principal object of the present invention to provide an improved camera objective lens adjustment.

Another object of the present invention is to provide an improved mechanism for angularly and translationally adjusting the objective lens on a camera.

Still another objective of the present invention is to provide an improved mechanism for the swinging adjustment of a camera objective lens about different axes and for the translational adjustment thereof in a plane parallel to the camera film plane.

A further object of the present invention is to provide an improved mechanism for universally adjusting the angle of a camera objective lens and for universally adjusting it in directions parallel to the plane of the camera film plane.

Still a further object of the present invention is to provide an adjustment mechanism of the above nature characterized by its simplicity, ruggedness, reliability, versatility and low cost.

The above and other objects of the present invention will become apparent from a reading of the following description taken in conjunction with the accompanying drawing which illustrates a preferred embodiment thereof.

In a sense the present invention contemplates the provision of a camera objective lens adjustment comprising a barrel member supporting an objective lens, a universal joint including a socket section and a ball section engaging said socket section and universally angularly adjustable therein and having a bore therethrough engaged by said barrel member, and means for supporting said socket section for movement in a plane parallel to the film plane of said camera.

According to the preferred embodiment of the present invention, there is provided an axially adjustable barrel provided with a coupling for mounting it to the camera and a circular plate is rotatably supported in the front of the adjustable barrel and has an eccentrically located bore therein with a spherical peripheral face defining the universal joint socket section. The universal joint ball section is in the form of a ring having a spherical peripheral surface engaging the socket spherical surface and is provided with a bore eccentric to the ball section axis and engaging the objective lens barrel.

The objective lens barrel in the improved mechanism is universally angularly adjustable and is universally adjustable for translational movement in directions parallel to the camera film plane.

The improved mechanism is simple, rugged and reliable, of low cost, compact, and highly versatile and adaptable.

DESCRIPTION OF THE PREFERRED EMBODIMENT

Figure 1:
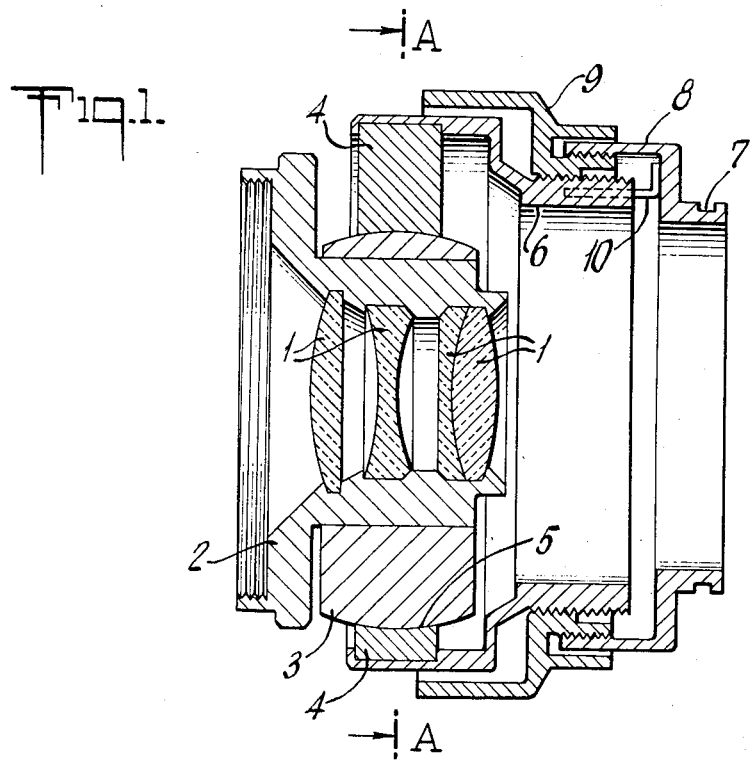
FIG. 1 is a longitudinal medial section view of an objective lens adjusting mechanism embodying the present invention.
Figure 2:
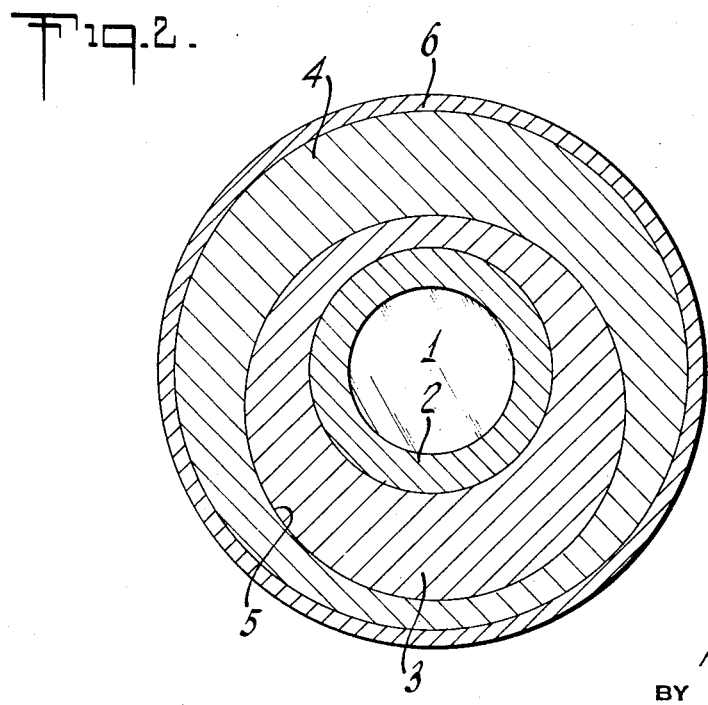
FIG. 2 is a sectional view taken along line A — A in FIG. 1.

Referring now to the drawing which illustrates a preferred embodiment of the present invention, the reference numeral 1 generally designates an objective lens system which is suitably housed in a lens barrel 2 which may also contain an adjustable iris diaphragm of known construction. The lens barrel 2 axially projects through and is secured in a bore located in a universal joint ball defining section 3 with flat front and rear faces the bore and lens barrel 2 being eccentric to the longitudinal axis of ball section 3.

The ball section 3 has a spherical outer peripheral face which slideably engages the socket defining inner spherical peripheral face 5 of a circular eccentric opening in an intermediate ring member 4, the amount of eccentricity of the barrel 2 in the ball section and the amount of the eccentricity of the ball section ring member being substantially identical. The ring member 4 is rotatably mounted in the front part of a barrel member 6. An outer barrel 8 of conventional construction is provided with a rear coupling section 7 permitting the mounting of the assembly to a camera body, a stationery guide key 10, and a distance or focussing ring 9 associated with barrel 6 in the known manner, such as by mating threads or a helical guide and follower system so that axial adjustment of barrel 6 and hence focussing is accomplished by turning ring 9, the barrel 6 having a longitudinal passage engaging key 10 to restrict barrel 6 to longitudinal movement. It should be noted that the assembly including elements 1, 2, 3 and 4 may be otherwise mounted in the camera for axial adjustment, such as by means of a bellows system and that the mechanism for the longitudinal axial adjustment of the objective lens may be mounted in the barrel 2.

In the operation of the improved objective lens adjustment mechanism described above, translation adjustment or displacement of the objective lens is accomplished by rotating ball section 3 in socket section 5, or by rotating ring member 4 in barrel 6 or both. The translational movement of the objective lens is thus achieved by reason of the eccentricity of barrel 2 in ball section 3, and the eccentricity of ball section 3 in ring member 4, and by reason of this double eccentricity the barrel 2 is universally moveable any desired distance in a plane parallel to the camera film plane and perpendicular to the longitudinal axis of barrel 8.

Angular adjustment of the barrel 2 is accomplished merely by swinging the ball section 3 by way of barrel 2, in socket section 5. The angular adjustment may be effected about a horizontal axis or a vertical axis or about any oblique axis and so that universal angular adjustment of the objective lens may be obtained. In order to further facilitate and control such adjustment any suitable known mechanism may be provided such as a screw clamp device, a click arrangement, an eccentric cam or the like.

While there has been described and illustrated a preferred embodiment of the present invention it is apparent that numerous alterations, omissions and additions may be made without departing from the spirit thereof.

What is claimed is:

1. A camera objective lens adjustment comprising a barrel member supporting an objective lens, a universal joint including a section having a socket and a ball section engaging said socket and universally angularly adjustable therein and having an eccentric bore therethrough engaged by said barrel member, and means for supporting said socket section for rotation about an axis perpendicular to the film plane of said camera and eccentric to the axis of said socket wherein said barrel is adjustable in an axial direction, said support means comprising a first ring member defining said socket section supported by said axially adjustable barrel for rotation about said axis and having a bore eccentric relative to said axis and with a spherical peripheral face defining said socket section.

2. The camera objective lens adjustment of claim 1 comprising a barrel axially adjustable in a direction perpendicular to said film plane, said supporting means being mounted on said axially adjustable barrel.

3. The camera objective lens adjustment of claim 2 wherein said socket section bore is eccentric relative to the central axis of said ball section.

* * * * *